United States Patent
Ruppel et al.

(10) Patent No.: US 12,187,281 B2
(45) Date of Patent: Jan. 7, 2025

(54) MODE SELECTOR MODULE FOR A VEHICLE COMPONENT

(71) Applicant: Aptiv Technologies AG, Schaffhausen (CH)

(72) Inventors: Christopher D. Ruppel, Carmel, IN (US); David J. Imboden, Kokomo, IN (US); Gregory C. Kuhlman, Kokomo, IN (US); Amit K. Pande, Kokomo, IN (US)

(73) Assignee: Aptiv Technologies AG, Schaffhausen (CH)

(*) Notice: Subject to any disclaimer, the term of this patent is extended or adjusted under 35 U.S.C. 154(b) by 356 days.

(21) Appl. No.: 17/656,199

(22) Filed: Mar. 23, 2022

(65) Prior Publication Data
US 2022/0212667 A1 Jul. 7, 2022

Related U.S. Application Data

(63) Continuation of application No. 16/561,299, filed on Sep. 5, 2019, now Pat. No. 11,338,811.

(51) Int. Cl.
*B60W 30/18* (2012.01)
*G08G 1/01* (2006.01)
(Continued)

(52) U.S. Cl.
CPC ..... *B60W 30/18018* (2013.01); *G08G 1/0125* (2013.01); *G08G 1/091* (2013.01); *H04W 4/40* (2018.02); *H04W 52/36* (2013.01)

(58) Field of Classification Search
CPC . B60W 30/18018; H04W 4/40; H04W 52/36; G08G 1/091; G08G 1/0125
(Continued)

(56) References Cited

U.S. PATENT DOCUMENTS

| 1,180,905 A * | 4/1916 | Carter | B62B 1/24 |
| | | | 298/7 |
| 6,856,654 B1 * | 2/2005 | Carkner | H04B 15/005 |
| | | | 375/295 |

(Continued)

FOREIGN PATENT DOCUMENTS

| CN | 104512266 A | 4/2015 |
| CN | 104724112 A | 6/2015 |

(Continued)

OTHER PUBLICATIONS

"Foreign Office Action", DE Application No. 102020122802.3, Sep. 1, 2022, 11 pages.
(Continued)

*Primary Examiner* — Yazan A Soofi
(74) *Attorney, Agent, or Firm* — Harness, Dickey & Pierce, P.L.C.

(57) ABSTRACT

Techniques are provided for operating a vehicle in a first vehicle mode; operating at least one component of the vehicle in a first component mode; detecting a first change in operation of the vehicle from the first vehicle mode to a second vehicle mode different from the first vehicle mode; based on the detected the first change in the operation of the vehicle, predicting a second change in operation of the vehicle; in response to predicting the second change in operation of the vehicle, operating the at least one component in a second component mode different from the first component mode prior to the predicted second change in operation of the vehicle.

22 Claims, 4 Drawing Sheets

(51) Int. Cl.
   *G08G 1/09* (2006.01)
   *H04W 4/40* (2018.01)
   *H04W 52/36* (2009.01)

(58) Field of Classification Search
   USPC .......................................................... 701/99
   See application file for complete search history.

(56) References Cited

U.S. PATENT DOCUMENTS

| | | | | |
|---|---|---|---|---|
| 7,741,805 B2* | 6/2010 | Zhang | ..................... | H02J 9/002 |
| | | | | 320/152 |
| 7,941,110 B2* | 5/2011 | Gonzalez | ............. | H04B 1/1607 |
| | | | | 455/127.5 |
| 8,032,189 B2* | 10/2011 | Guthrie | .................. | G06F 1/305 |
| | | | | 455/574 |
| 8,290,650 B2* | 10/2012 | Watanabe | ............... | F02D 29/02 |
| | | | | 701/99 |
| 8,938,332 B1* | 1/2015 | Zhang | .................. | B60W 10/30 |
| | | | | 701/36 |
| 2005/0268632 A1* | 12/2005 | Yonekura | ................. | B60H 1/00 |
| | | | | 62/323.3 |
| 2007/0075919 A1* | 4/2007 | Breed | ................. | B60R 21/0132 |
| | | | | 345/8 |
| 2008/0086240 A1* | 4/2008 | Breed | .................... | G07C 5/008 |
| | | | | 701/1 |
| 2012/0004996 A1* | 1/2012 | Ramer | ................ | G06F 16/9538 |
| | | | | 705/14.46 |
| 2013/0158838 A1* | 6/2013 | Yorke | .................. | B60W 10/115 |
| | | | | 701/123 |
| 2014/0257637 A1* | 9/2014 | Sangameswaran | ... | B60W 30/09 |
| | | | | 701/1 |
| 2015/0218872 A1* | 8/2015 | Breed | ................. | F02N 11/0807 |
| | | | | 701/2 |
| 2019/0071067 A1* | 3/2019 | Leone | ............. | B60W 30/18018 |
| 2019/0093581 A1* | 3/2019 | Vadlamani | ...... | B60W 30/18072 |
| 2019/0327580 A1* | 10/2019 | Chang | ............... | H04W 52/0261 |
| 2021/0070296 A1* | 3/2021 | Ruppel | ................. | G08G 1/091 |

FOREIGN PATENT DOCUMENTS

| | | |
|---|---|---|
| CN | 104769809 A | 7/2015 |
| CN | 105763217 A | 7/2016 |
| CN | 108275094 A | 7/2018 |
| DE | 102017104156 A1 | 9/2017 |
| DE | 102018121700 A1 | 3/2019 |

OTHER PUBLICATIONS

"National Motorists Association Foundation, Yellow Light Time Standards", 2016, Retrieved from http://www.shortyellowlights.com/standards/, 2 pages.

Office Action issued in Corresponding Chinese Patent App. No. 202010843939X dated May 25, 2024.

* cited by examiner

MODE SELECTOR MODULE FOR A VEHICLE COMPONENT

CROSS-REFERENCE TO RELATED APPLICATIONS

This application is a continuation of U.S. patent application Ser. No. 16/561,299, filed Sep. 5, 2019, the disclosure of which is hereby incorporated by reference in its entirety herein.

TECHNICAL FIELD OF INVENTION

This disclosure generally relates to automotive vehicles. More specifically, this disclosure relates to techniques for operating vehicle components.

SUMMARY OF THE INVENTION

Techniques are provided for operating a vehicle in a first vehicle mode; operating at least one component of the vehicle in a first component mode; detecting a first change in operation of the vehicle from the first vehicle mode to a second vehicle mode different from the first vehicle mode; based on the detected the first change in the operation of the vehicle, predicting a second change in operation of the vehicle; in response to predicting the second change in operation of the vehicle, operating the at least one component in a second component mode different from the first component mode prior to the predicted second change in operation of the vehicle.

A system is provided that includes a mode selector module, said module configured to detect that a vehicle is operating in a first vehicle mode; in response to detecting that the vehicle is operating in a first vehicle mode, cause at least one component of the vehicle to operate in a first component mode; detect a first change in operation of the vehicle from the first vehicle mode to a second vehicle mode different from the first vehicle mode; in response to detecting the first change in the operation of the vehicle, predict a second change in operation of the vehicle; in response to predicting the second change in operation of the vehicle, cause the at least one component to operate in a second component mode different from the first component mode prior to the predicted second change in operation of the vehicle.

These and other aspects, features, and implementations can be expressed as methods, apparatus, systems, components, program products, means or steps for performing a function, and in other ways.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
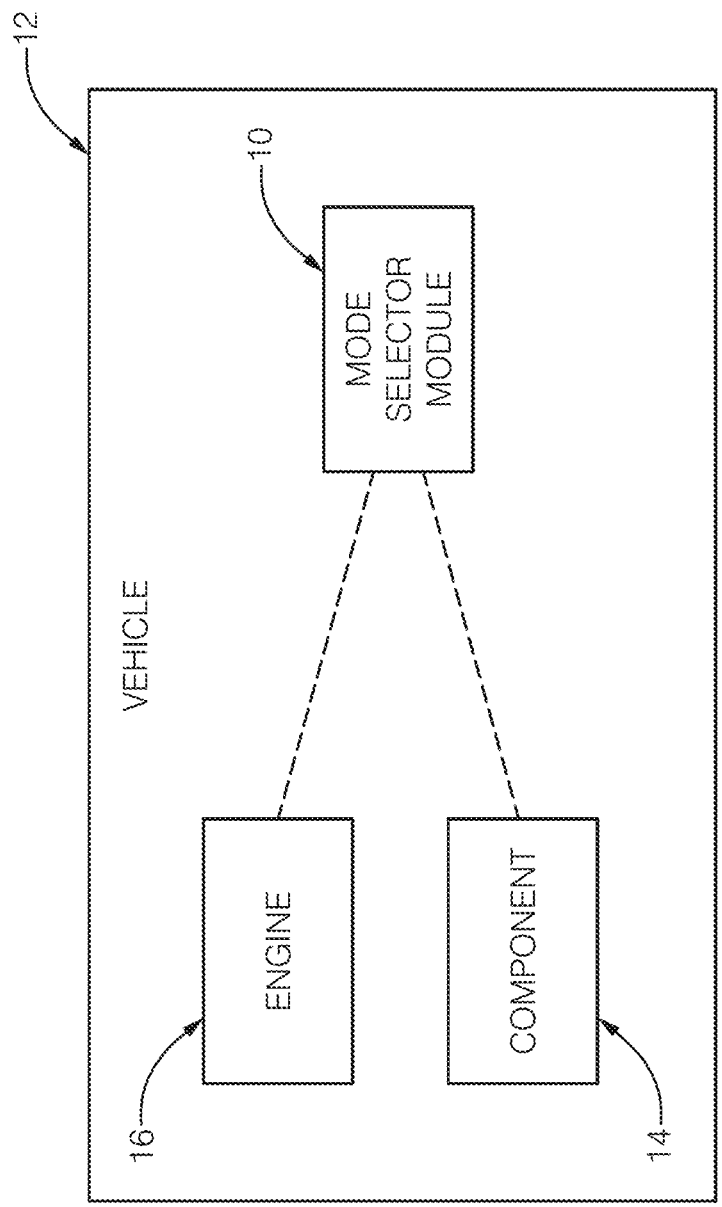
FIG. 1 is a diagram of a mode selector module for a vehicle in accordance with one embodiment.

Reference will now be made in detail to embodiments, examples of which are illustrated in the accompanying drawings. In the following detailed description, numerous specific details are set forth in order to provide a thorough understanding of the various described embodiments. It will be appreciated that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Traditional automotive vehicles are configured such that the car engine runs continually while operated by a driver, until the driver him/herself turns of the vehicle engine. The engine of such a traditional vehicle continues to run even when the vehicle is temporarily stopped moving, for example when the driver stops at a stoplight or stop or stop sign, or stops for any other reason. In some examples, in order to save energy, some modern automotive vehicles have been adapted such that electronics associated with the vehicle detect when the vehicle has stopped moving (e.g., detected vehicle speed or detected actuation of brake pedals), and causes the vehicle engine to shut down temporarily while the vehicle is in a motionless state. Once the vehicle receives an indication that the driver desires to resume travelling with the vehicle (e.g., the brake pedal is released, and/or the accelerator pedal is actuated), the vehicle electronics detect the indication and restart the engine. This allows the user to travel as desired, but minimizes an amount of time that the vehicle engine is running, thereby reducing energy consumption of the vehicle.

In some examples, a vehicle may include one or more components that require a stable power supply in order to function correctly. For example, some electrical components may cease to function altogether if a power supply for the component is drops below a certain voltage or current level. In other examples, an electrical component may be configured to automatically reset, or reboot, should a supply voltage or current drop below a suitable level for operation or a predetermined level. Such components may be operated to reset, or reboot, to ensure longevity and/or consistent operation of the component. As one non-limiting example, a communications device (e.g., a Vehicle to Everything (V2X) communications module) of a vehicle may be configured to reboot in response to a reduced power supply level, to ensure that the drop in power supply level does not damage one or more components of the communications device, such as a memory component.

While automotive vehicles configured to automatically react to stopping of the vehicle by turning off the vehicle engine when the vehicle is stopped advantageously reduce power consumption of the vehicle, restarting a vehicle engine from a stopped state causes a relatively large amount of current to be drawn from the electrical system of the vehicle, and therefore a reduction in voltage level of the power supply used by components of the vehicle. Such a vehicle engine startup is referred to as a "crank event" herein. While some vehicle components may continue to function properly though such a crank event, other vehicle components (as described above), may not continue to function properly, and/or may be configured to automatically restart and/or reboot when the power supply (e.g., voltage level) drops.

To address this issue, some vehicles are designed with dedicated circuitry or other components intended to minimize the impact of a temporary reduction in power supply caused, for example, by a crank event. For example, some automotive vehicles may be equipped with relatively large storage capacitors configured to store electrical charge that may be provided to one or more vehicle components when the vehicle power supply drops. In other examples, automotive vehicles may be equipped with voltage regulation (e.g., linear voltage regulator) and/or power regulation component (e.g., DCDC boost converters) configured to increase a voltage level of a power supplied to a component in response to a detected drop in power supply voltage level. The above-mentioned techniques for addressing power supply voltage drops in vehicles may be undesirable, as they may increase cost, complexity, and flexibility in manufacture of the vehicle.

This disclosure is directed to techniques for improving an ability of automotive vehicle components to withstand the negative effects described above in light of a temporarily reduced power supply, which may be caused, in one example, by a crank event. FIG. 1 illustrates one non-limiting example of a vehicle 12 that includes a mode selector module 10 and a component 14. The mode selector module 10 operates to predict a temporary low supply voltage event, and cause component 14 to operate differently prior to and/or during the low supply voltage event. For example, the mode selector module 10 may determine that a temporary reduction in power supply voltage is likely to occur, and in response to identifying the likely temporary reduction, cause component 14 to operate in a low power mode, in which component 14 operates differently to minimize power consumption. In this manner, disruption of operation of component 14, and/or a reboot or reset of component 14, as a result of the temporary reduction in power supply may be avoided, thereby improving usability of component 14.

In some examples, mode selector module 10 may be part of component 14, may be separate from component 14, or may be part of other electrical or computing systems of the vehicle 12. In any of these cases, mode selector module 10 is configured to receive information indicative of a state of vehicle 18, and based on such information, determine that a crank event is likely to occur in the future. For example, the vehicle may be operated in a first mode, for example a mode in which the vehicle engine is running according to typical operation of the vehicle. At the same time, a component 14 of the vehicle is operated in a first component mode. As a non-limiting example, the component may be a communications device of the vehicle, such as a vehicle-to-vehicle (V2V), vehicle-to-infrastructure (V2I), and/or vehicle to everything (V2X) transceiver component. According to this example, the mode selector module 10 may detect that a first change in operation of the vehicle, for example a change from the first vehicle mode where the vehicle engine is running, to a second vehicle mode where the vehicle engine has been stopped. Based on detecting the first change in operation, the mode selector module 10 may predict a second change in operation of the vehicle. In some examples, the second change in operation of the vehicle may be a change from the second vehicle mode (engine stopped), to the first vehicle mode (engine is started). In some examples, the second change in operation of the vehicle may include a crank event, where the vehicle engine is started from a stopped state.

In some examples, predicting the second change in operation of the vehicle includes determining when the second change in operation will occur (e.g., when the vehicle engine will be restarted), and/or a duration of the second change in operation (e.g., where the second change in operation is a crank event, how long the crank event will last).

Based on predicting the second change in operation of the vehicle, mode selector module 10 causes component 14 to operate in a second component mode prior to the predicted second change in operation of the vehicle 12. For example, where the second change in operation of the vehicle is a crank event, mode selector module 10 may cause component 14 to operate in a low power mode where the component consumes less power than in the first component mode. Mode selector module 10 may cause the component to operate in the low power mode throughout a duration of the second change in operation of the vehicle (e.g., throughout a duration of a crank event).

In some examples, mode selector module 10 is configured to send an indication of an anticipated second change in operation of the vehicle to component 14, and component 14 is specifically configured to operate in a low power mode in response to the indication. In other examples, mode selector module 10 is configured to control operation of component 14, for example to control a signal transmission rate of component 14 when component 14 is a transmitter/transceiver device. According to such examples, mode selector module 10 may directly modify operation of component 14 to operate in the low power mode in response to determining a likely crank event.

As used herein, the phrase "low voltage mode" refers to a mode of operation in which the component 14 can continue to function, albeit in some examples with reduced functionality or performance, during a low supply voltage event (which may be caused by, for example, a crank event as described above). In one example, the component 14 is a transmitter or a transceiver that includes a transmitter. While operating with reduced function, the transmitter transmits with lower power and/or transmits with a reduced transmit repetition rate during a crank event. The transmitter consumes power with each communication signal output by the transmitter. In some examples, the transmitter is configurable to operate in a normal mode outputting communications signals at a typical rate. As one non-limiting example, such a normal rate is ten times per second, and the normal power level is one Watt (1 W). According to the techniques described herein, based on predicting a crank event, the transmitter is operated in a low voltage mode, where the transmitter outputs communications signals at a reduced rate relative to the above-described normal rate. For example, the reduced rate is one time per second, instead of 10 times per second. According to this non-limiting example, operating component 14 at such a reduced rate may consume one tenth (1/10th) of a Watt, instead of one Watt at the normal rate. In this manner, because the transmitter component 14 consumes less power during the crank event by reducing a data transmission rate of the transmitter component, transmitter component 14 does not automatically reset as a result of the reduction in power supply. As such, functionality provided by component 14 is not unduly disrupted as a result of the temporary reduction in power supply Examples of a component 14 that may be operated in a low power mode as described herein may include a transmitter or transceiver device configured to enable a vehicle to communicate such as a vehicle to vehicle (V2V) communications device, a vehicle to everything communications device (V2V) and/or vehicle to infrastructure (V2I) communications device. In other examples, component 14 may include other types of communications devices, such as a cellular network transceiver, a Wi-Fi transmitter, or a Bluetooth transmitter. It will be appreciated that the techniques of this disclosure are not limited to any of the above-described communication devices, or any type of devices in general including devices not associated with communications. It will be appreciated that the techniques described herein, which include causing a vehicle component to operate in a low power mode based on predicting a likely crank event, may be applied to any vehicle component for which it is desirable to minimize disruption as a result of a temporary reduction in supply voltage. These techniques may provide benefits by not relying on expensive and/or difficult to implement alternatives, such as the addition of storage capacitors, power regulators, power converters, or other devices or circuitry to minimize the impact of a temporary reduction in power supply.

As discussed above, mode selector module 10 is configured to predict, or anticipate, a likely crank event prior to when it occurs. A crank event occurs when a vehicle engine is started, i.e. when the engine transitions from an off state to an on state.

In some examples, for purposes of saving energy, a vehicle system (e.g., an engine control unit (ECU) of the vehicle 12) is configured to turn off the engine 16 automatically when, or shortly after, the vehicle 12 stops moving, such as when the vehicle 12 has stopped at a traffic signal. The vehicle system may then then automatically restart the engine 16 in response to, for example, releasing the brake pedal, or pressing the accelerator pedal, by an operator of the vehicle 12. If the vehicle 12 is an automated vehicle, i.e. an autonomous or driverless vehicle, the automated controls of the vehicle 12 may control the operation of the brakes and/or accelerator.

In some examples, mode selector module 10 is configured to determine a first change in operation of the vehicle (e.g., when the vehicle engine has been turned off). For example, mode selector module 10 may receive an indication from an engine control unit (ECU) of the vehicle that the vehicle engine has been turned off. In other examples, mode selector module 10 may instead itself determine when the vehicle engine has been turned off, based on data available from other systems of the vehicle. For example, mode selector module 10 may be communicatively coupled to a communications bus (e.g., a controller area network (CAN) bus) via which mode selector module receives data indicating a state of the vehicle or vehicle components. For example, actuation or compression of a brake pedal may provide an indication that the vehicle engine has, or will be, turned off. According to this example, mode selector module 10 may determine, based on brake actuation data transmitted by the brake system of the vehicle via the communications bus of the vehicle, that the brakes have been applied. According to another example, the vehicle engine, or sensors or components associated with the vehicle engine, may output a state indication whether the engine is running or not. Mode selector module 10 may determine, based on such engine state information, that the vehicle engine has been turned off.

If mode selector module 10 detects a first change in operation of the vehicle (e.g., that the vehicle engine has turned off), mode selector module 10 may then attempt to predict when the vehicle engine will again be turned on. In this manner, mode selector module 10 uses the vehicle turn off as a trigger to predict a second change in operation of the vehicle (e.g., an upcoming crank event).

Mode selector module 10 may predict or anticipate a forthcoming crank event based on various information dependent on the driving context in which the vehicle engine was shut off. The techniques described herein are not limited to any particular situation based on specific examples described. As such, any mechanism to anticipate a crank event is within the scope of this disclosure.

In some examples, as described above, a vehicle is configured to automatically shut off the vehicle engine when the vehicle is stopped (e.g., at a stop signal, a stop sign, etc.), and turn on the vehicle engine when the operator (e.g., human or autonomous driver) indicates a desire to again travel with the vehicle (e.g., releases brake pedal or actuates accelerator pedal). In such a scenario, the vehicle operator may likely indicate a desire to again travel with a vehicle previously stopped due to a stop light, when that stop light turns from red to green.

In such circumstances, mode selector module 10 may anticipate or predict a second change in operation of the vehicle (e.g., an upcoming crank event) based on when the traffic light, which caused the vehicle to stop by turning red, will again turn to green, because the vehicle operator will likely seek to again travel with the vehicle when the traffic light turns green. In some examples, mode selector module 10 may predict when the second change in operation of the vehicle will occur based data indicating a light change interval for the traffic light. For example, mode selector module 10 may be configured to access publicly available data provided over a network such as the internet that indicates a light change schedule for the traffic light. Such data may be published by a local traffic authority, or may be included with publicly available digital map data used by navigation systems to, for example, determine a travel time along a defined route. According to other examples, where such data is not readily available, mode selector module 10 may attempt to predict when the light will change by data historically captured by the vehicle itself based on previous encounters with the traffic light, or by multiple vehicles based on previous encounters with the traffic light, where such data is available to mode selector module via a network (e.g., cloud based data). In still other examples, a traffic light is associated with one or more roadside communications module(s) (e.g., V2I module) configured to transmit traffic information to vehicles on a roadway. According to these examples, mode selector module 10 may, via a V2X, V2V, or V2I communications module of the vehicle, or other communications protocols available to the vehicle, to receive data from the roadside communications module and use that data to determine when the traffic light will change from red to green.

In other examples, the mode selector module 10 predicts a second change in operation of the vehicle (e.g., a crank event) based on information from perception sensors (e.g. camera, radar, lidar) on board the vehicle 12 and/or other sensors proximate to the vehicle 12. In one example, the other sensors are mounted on other vehicles and the information is communicated using V2V communications. In another example, the perception sensors are part of infrastructure (e.g. a traffic camera) and the information is communicated using V2I or other communications techniques. In another example, a camera on the vehicle 12 is used by the mode selector module 10 to determine that the brake lights of the forward vehicle have turned off, and uses that information as an indicator that the traffic signal has turned green, i.e. that a crank event is about to occur. In another example, the mode selector module 10 detects that the forward vehicle has begun to move as an indicator that the traffic signal has turned green. A perception sensor on the vehicle 12 may be used to determine that the forward vehicle is moving.

The above paragraphs described on example of how mode selector module 10 may anticipate an upcoming crank event in the scenario where the vehicle stops at a traffic light. Once the mode selector module 10 determines that a crank event is likely to occur, and/or when that crank event is likely to occur, mode selector module 10 causes component 14 to operate in a low power mode prior to the expected crank event. For example, where the component 14 is a transceiver component (e.g., a V2X transceiver), mode selector module 10 may cause the component to operate with a reduced transmission rate, thereby temporarily reducing power consumption of the component 14 for the duration of the crank event. Once the crank event is complete, and the vehicle engine is fully running, mode selector module 10 may cause the component 14 to again operate in a normal state (e.g., when the component is a transceiver component, at a normal transmission frequency).

As described above, mode selector module 10 may anticipate a crank event in scenarios other than a vehicle engine that is stopped at a traffic light. One such example is when a vehicle is stopped due to heavy "stop and go" traffic. According to this example, mode selector module 10 may predict the crank event based one or more perception sensors (camera, radar, lidar, etc.) identifying that brake lights of one or more surrounding vehicles (vehicles on the same or adjacent roadways) have changed (e.g., turned off), or that one or more surrounding vehicles have begun to again travel. In another example, the mode selector module 10 predicts the crank event based on a vehicle-to-vehicle (V2X, V2V, V2I) communication from surrounding vehicles, transportation infrastructure, or other signaling that indicates traffic is or will soon move.

The mode selector module 10 may be implemented via hardware, software, firmware, and the like, or any combination thereof. In cases where mode selector module 10 are implemented in software and/or firmware, the respective modules described herein may comprise program instructions stored in a tangible medium (e.g., short term memory, long term storage, and the like) and executable by one or more processors to implement the functionality described herein. According to examples where mode selector module 10 are implemented in software, the respective modules may comprise separate instructions which may be executed by a single processor device, or multiple discrete processor devices, which may reside in a single location (e.g., within the electrical system of a transport vehicle), or multiple distributed locations communicatively coupled to one another via a network.

As described herein, mode selector module 10 is configured to predict a second change in operation of a vehicle (e.g., an upcoming crank event), and cause component 14 to operate in a low power mode for at least a majority of the duration of the second change in operation of the vehicle. In some examples, mode selector module 10 may be a standalone hardware component, or software executing on a standalone hardware component, that is in communications with component 14 and configured to cause component 14 to operate in the low power mode. In other examples, mode selector module 10 may be implemented as part of other components of the vehicle, such as one or more electronic control systems of the vehicle, for example an engine control unit (ECU) of the vehicle. In still other examples, mode selector module 10 may be part of component 14 itself, either as a standalone component housed within the same housing as component 14, or as software executed on a processor associated with component 14. In some examples, mode selector module 10 is configured to output a signal or flag indicating that component 14 should operate in a low power mode, and component 14 is specifically configured to receive such instructions and control itself to operate in the low power mode. In other examples, mode selector module 10 may be included with, or otherwise capable of, controlling circuitry and/or software capable of directly controlling operation of component 14 (e.g., where component 14 is a transceiver, to control a transmission frequency of the transceiver component).

Figure 2:
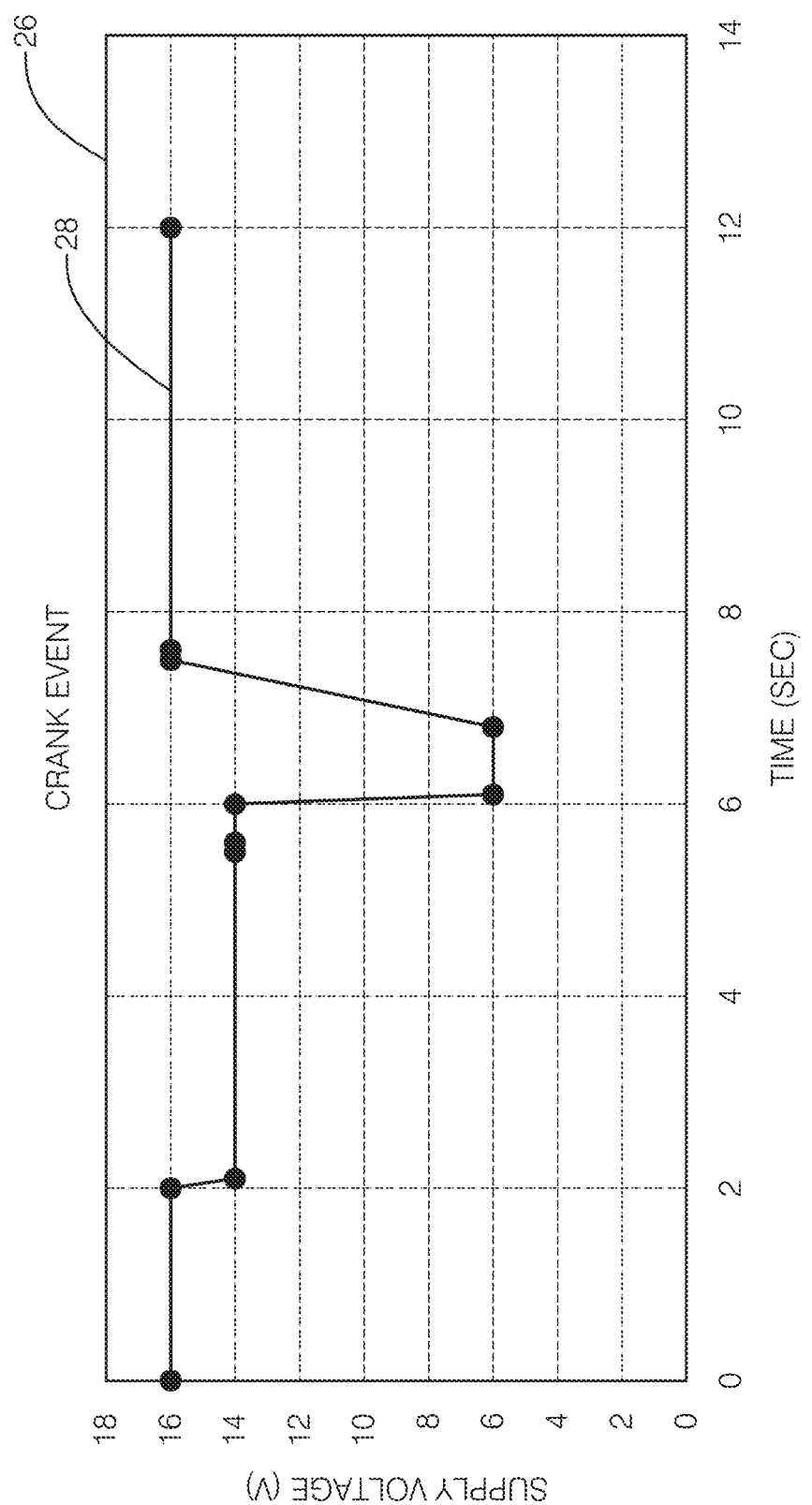
FIG. 2 is a graph of voltage signals present a vehicle in accordance with one embodiment.

FIG. 2 illustrates an example of a graph 26 of voltages during a crank event. The supply voltage 28 is 16 Volts at time=0 seconds. This condition corresponds to when the engine 16 is running and the charging system is operating. As shown in FIG. 2, the engine is turned off at time=2 seconds. As a result, the supply voltage decreases to 14 Volts because the charging system is not operating to charge the battery of the vehicle 12. According to the example of FIG. 2, the mode selector module 10 predicts that a crank event is imminent at time=5.5 seconds. The mode selector module may predict the imminent crank event based on various information and data, some examples of which are described herein.

Based on predicting when the crank event will occur, the mode selector module 10 operates to cause the component 14 to begin operating in the low voltage mode prior to the crank event. For example, where the component 14 is a transceiver component, mode selector module 10 may signal, or otherwise cause the component to operate with a reduced transmission frequency in comparison to normal operation for the component. According to the example of FIG. 2, the time interval between the engine turning off and initiating a restart of the engine 16 is about 2 seconds. As shown in the example of FIG. 2, the crank event begins, i.e. starting the engine 16 initiates, at time=6 seconds. The supply voltage 28 decreases to 6 Volts due to the large current draw from the battery. As shown in the example of FIG. 2, starting the engine 16, the crank event, finishes at time=6.8 seconds. As shown in the example of FIG. 2 the supply voltage 28 increases in response to the battery charging system returning to normal operation. The mode selector module 10 determines that the crank event has completed, based on one or more of determining that the engine is running, determining that the supply voltage 28 has reached a suitable level, or based on a predetermined or historically determined duration of crank events for the vehicle. In response, the mode selector module 10 operates to cause the component 14 to again operate in the normal voltage mode.

Figure 3:
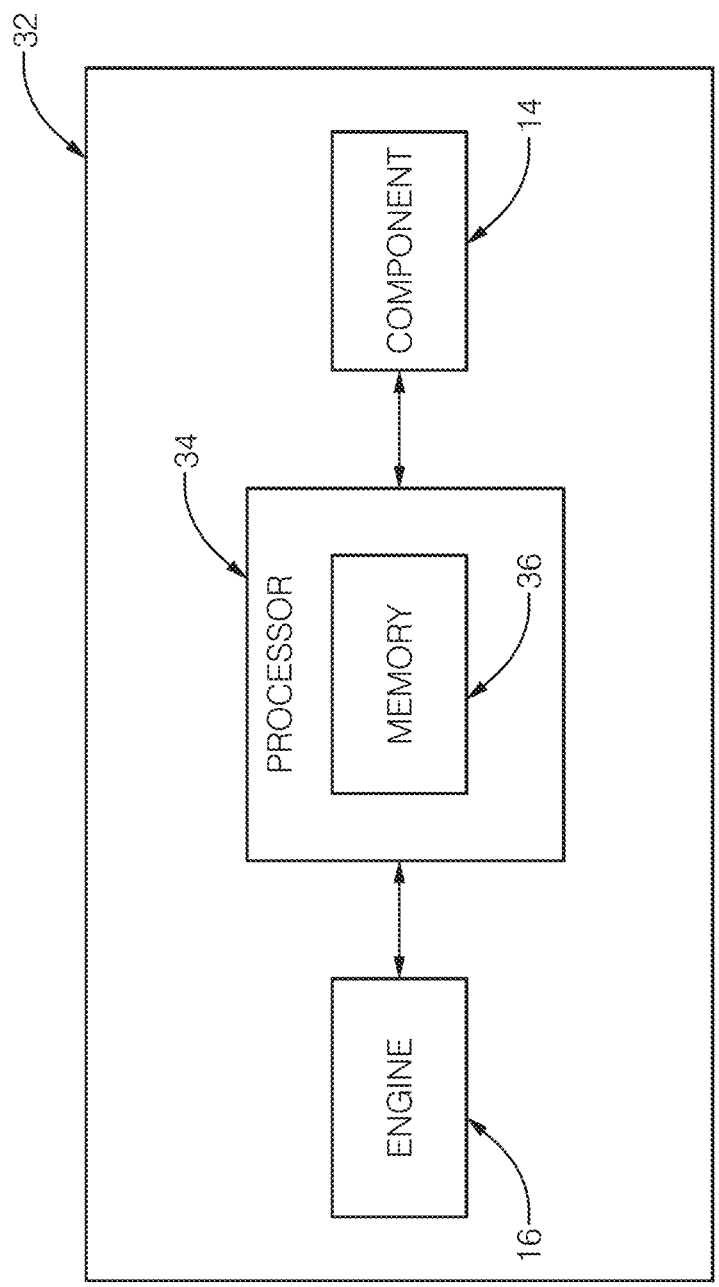
FIG. 3 is a diagram of a system for a vehicle in accordance with one embodiment.

FIG. 3 illustrates an example of a system 32 that shows one example of hardware that may be installed on a vehicle and used to implement the techniques of this disclosure. The system 32 includes one or more instances of a processor 34 such as one or more instances of a processing unit (e.g. GPU, CPU, ALU, FPGA, DSP, μP), or other control circuitry such as analog and/or digital control circuitry including an application specific integrated circuit (ASIC) for processing data as should be evident to those in the art. While FIG. 3 shows only a single processor 34, it is recognized that the functions of the processor 34 may be shared or distributed among several instances of processors that are each configured for some specific task. In some examples, the processor 34 includes memory 36, i.e. a non-transitory computer-readable storage-medium 36, including non-volatile memory, such as electrically erasable programmable read-only memory (EEPROM) for long term storage of one or more routines, thresholds, and captured data. The one or more routines may be executed by the processor 34 to perform steps for predicting a crank event based on signals received by processor 34 as described herein. In this non-limiting example, the mode selector module 10 is a software routine executed by the processor 34. Various means by which the processor 34 communicates with the engine 16 and the component 14 are described elsewhere herein.

Figure 4:
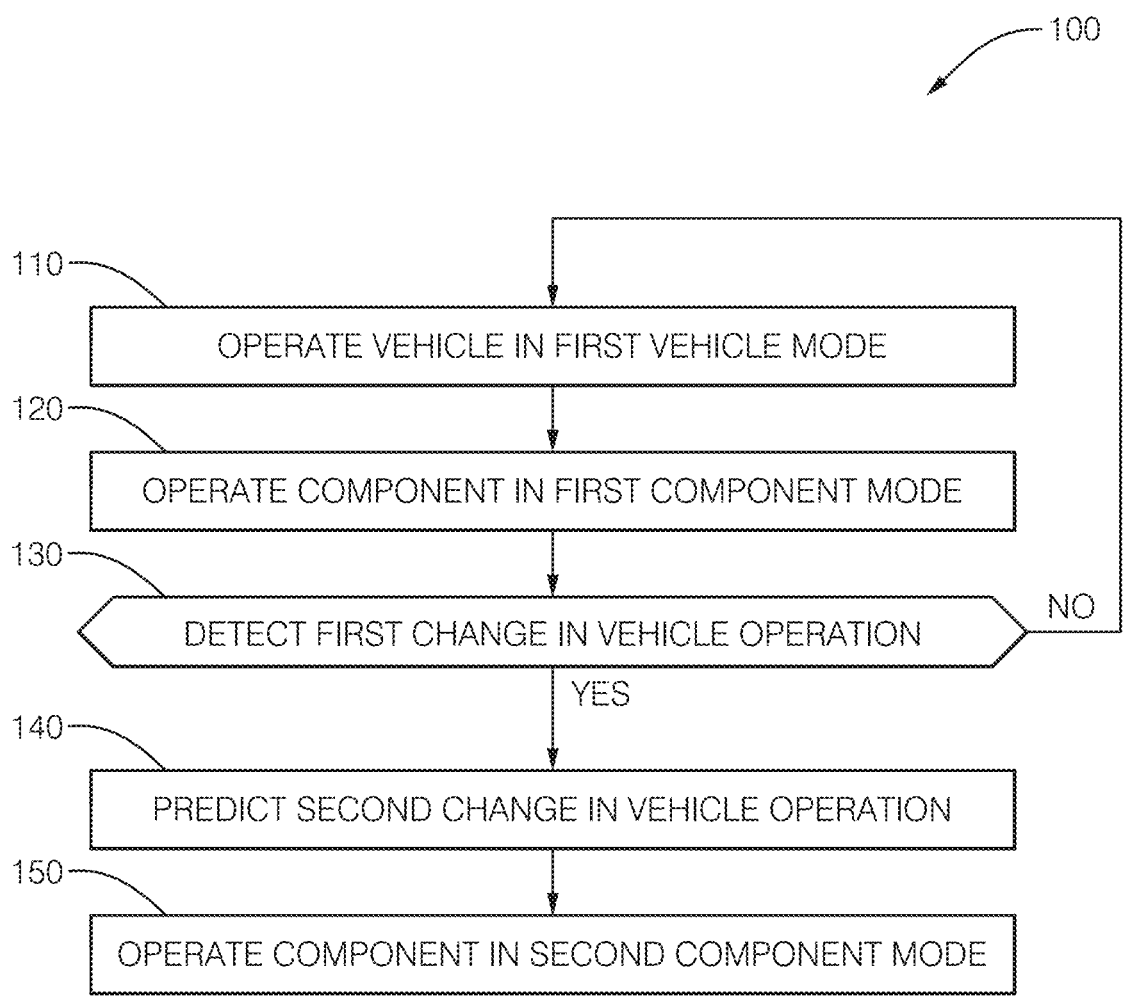
FIG. 4 is a method of operating the mode selector module of FIG. 1 in accordance with one embodiment.

FIG. 4 illustrates an example of a method 100. As shown in FIG. 4, the method 100 includes operating the vehicle 12 in a first vehicle mode (step 110). In one example, the first vehicle mode is defined by at least the engine 16 is running, i.e. the engine 16 is turned on.

As shown in FIG. 4, the method 100 also includes operating at least one component 14 of the vehicle 12 in a first component mode (step 120). According to examples where component 14 is a communications module (e.g., a V2X communications device), operating component 14 in the first component mode includes operating the communications device at a typical transmission power and/or transmission repetition rate.

As shown in FIG. 4, the method 100 also includes detecting a first change in operation of the vehicle 12 (step 130). In one example, the first change in operation corresponds to changing operation of the vehicle 12 from the first vehicle mode to a second vehicle mode different from the first vehicle mode. For example, the first vehicle mode may correspond to the engine running, and the second vehicle mode corresponds to engine 16 not running. For this example, detecting the first change in operation corresponds to detecting that engine 16 has turned from an on state to an off state.

The method 100 also includes, based on the detected the first change in the operation of the vehicle 12, predicting a second change in operation of the vehicle. The mode selector module 10 may predict whether the second change in operation of vehicle 12 will occur, and/or when the second change in operation of vehicle 12 will occur (step 140). In one example, the second change in operation of the vehicle includes turning on (i.e. starting) the engine 16.

As shown in FIG. 4, the method 100 also includes, in response to predicting the second change in operation of the vehicle 12, operating the at least one component 14 in a second component mode prior to the predicted second change in operation of vehicle 12 (step 150). The second component mode is different from the first component mode. In one example, the second component mode corresponds to a low supply voltage mode that temporarily reduces an amount of energy consumed by component 14.

In another example of the method 100, the at least one component of the vehicle is a transmitter device. In this example, operating the at least one component in the first component mode includes at least one of operating the transmitter device at a first transmission power level and operating the transmitter device at a first repetition rate. In one example, the first component mode is defined by the first transmission power level being 1 Watt. In another example, the first component mode is defined by the first repetition rate being 10 transmits per second. In yet another example, the first component mode is defined by both the first transmission power level being 1 Watt and the first repetition rate being 10 transmits per second.

In one example, operating the at least one component in the second component mode includes at least one of operating the transmitter device at a second transmission power level different than the first transmission power level and/or operating the transmitter device at a second repetition rate different than the first repetition rate. In one example, the second component mode is defined by the second transmission power level being 0.1 Watt. In another example, the second component mode is defined by the second repetition rate being 1 transmit per second. In yet another example, the second component mode is defined by both the second transmission power level being 0.1 Watt and the second repetition rate being 1 transmit per second. That is, the second transmission power level is less than the first transmission power level, and/or the second repetition rate is less than the first repetition rate.

In one example of the method 100, the transmitter device is part of one of a vehicle to everything (V2X) transceiver, a vehicle to infrastructure (V2I) transceiver, and a vehicle to vehicle (V2V) transceiver. In other examples, the transmitter device is part of a cellular network transceiver or a Wi-Fi network transceiver.

Operating the transmitter device in the second component mode prior to the predicted second change in operation (e.g. the crank event) allows the transmitter device to continue functioning during the reduction in the voltage level supplied to the transmitter device caused by the predicted second change in operation of the vehicle 12.

The second component mode is used so the component 14 can at least maintain volatile memory and/or maintain minimal operation. As one example, the crank event causes a momentary, typically less than 1 second, reduction in the supply voltage 28 to, for example, 6V from greater than 12V. As used herein, a momentary reduction in the supply voltage 28 is different from a long-term reduction in the supply voltage 28. In one example, a long-term reduction in the supply voltage 28 is defined as the supply voltage 28 being less than 2V for more than 60 seconds.

In some examples, not depicted in FIG. 4, after the second change in operation of the vehicle 12, method 100 may further include operating at least one component of the vehicle in the first component mode. That is, the component 14 returns to normal operation after the crank event and the supply voltage 28 returns to normal, e.g. >11V.

Described herein is a non-tangible computer readable storage medium 36 that stores instructions configured to cause a processing device 34 to: detect that a vehicle 12 is operating in a first vehicle mode; in response to detecting that the vehicle 12 is operating in a first vehicle mode, cause at least one component 14 of the vehicle 12 to operate in a first component mode; detect a first change in operation of the vehicle 12 from the first vehicle mode to a second vehicle mode different from the first vehicle mode; in response to detecting the first change in the operation of the vehicle 12, predict a second change in operation of the vehicle 12; in response to predicting the second change in operation of the vehicle 12, cause the at least one component to operate in a second component mode different from the first component mode prior to the predicted second change in operation of the vehicle 12.

While this invention has been described in terms of the preferred embodiments thereof, it is not intended to be so limited, but rather only to the extent set forth in the claims that follow.

ADDITIONAL EXAMPLES

Example 1. A method (100) comprising:
operating (110) a vehicle (12) in a first vehicle mode;
operating (120) at least one component (14) of the vehicle (12) in a first component mode;
detecting (130) a first change in operation of the vehicle (12) from the first vehicle mode to a second vehicle mode different from the first vehicle mode;
based on the detected the first change in the operation of the vehicle (12), predicting (140) a second change in operation of the vehicle (12);
in response to predicting the second change in operation of the vehicle (12), operating (150) the at least one component (14) in a second component mode different from the first component mode prior to the predicted second change in operation of the vehicle (12).

Example 2. The method (100) of example 1, wherein operating the vehicle (12) in the first vehicle mode comprises operating the vehicle (12) with an engine (16) of the vehicle (12) turned on.

Example 3. The method (100) of any of the previous examples, wherein operating the vehicle (12) in the second vehicle mode comprises operating the vehicle (12) with the engine (16) turned off, and wherein predicting the second change in operation of the vehicle (12) comprises predicting when the engine (16) will be turned on.

Example 4. The method (100) of any of the previous examples, wherein the at least one component (14) of the vehicle (12) is a transmitter device, and wherein operating the at least one component (14) in the first component mode includes at least one of operating the transmitter device at a first transmission power level and operating the transmitter device at a first repetition rate.

Example 5. The method (100) of example 4, wherein the transmitter device is part of one of a vehicle (12) to everything (V2X) transceiver, a vehicle (12) to infrastructure (V2I) transceiver, and a vehicle (12) to vehicle (V2V) transceiver.

Example 6. The method (100) of example 4 or 5, wherein operating the at least one component (14) in the second component mode includes at least one of operating the transmitter device at a second transmission power level different than the first transmission power level, and operating the transmitter device at a second repetition rate different from the first repetition rate.

Example 7. The method (100) of example 6, wherein the second transmission power level is less than the first transmission power level.

Example 8. The method (100) of examples 6 to 7, wherein the second repetition rate is less than the first repetition rate.

Example 9. The method (100) of examples 6 to 8, wherein the second change in operation of the vehicle (12) causes a reduction in a voltage level supplied to the transmitter device, and wherein operating the at least one component (14) in the second component mode prior to the predicted second change in operation allows the transmitter device to continue functioning with the reduction in the voltage level supplied to the transmitter device caused by the predicted second change in operation of the vehicle (12).

Example 10. The method (100) of any of the previous examples, further comprising: after the second change in operation of the vehicle (12), operating at least one component (14) of the vehicle (12) in the first component mode.

Example 11. The method (100) of any of the previous examples, wherein predicting the second change in operation of the vehicle (12) comprises estimating, based on when the first change in operation of the vehicle (12) occurred, when the second change in operation of the vehicle (12) will occur.

Example 12. The method (100) of any of the previous examples, wherein predicting the second change in operation of the vehicle (12) comprises determining, based on at least one communication received from a roadway infrastructure device, an indication of when at least one traffic condition that causes the second change in operation of the vehicle (12) will occur.

Example 13. The method (100) of any of the previous examples, wherein predicting the second change in operation of the vehicle (12) comprises determining, based on at least one communication received from at least one other vehicle, an indication of when at least one traffic condition that causes the second change in operation of the vehicle (12) will occur.

Example 14. A system (32) comprising:
a mode selector module (10), said module configured to detect that a vehicle (12) is operating in a first vehicle mode;
in response to detecting that the vehicle (12) is operating in a first vehicle mode, cause at least one component (14) of the vehicle (12) to operate in a first component mode;
detect a first change in operation of the vehicle (12) from the first vehicle mode to a second vehicle mode different from the first vehicle mode;
in response to detecting the first change in the operation of the vehicle (12), predict a second change in operation of the vehicle (12);
in response to predicting the second change in operation of the vehicle (12), cause the at least one component (14) to operate in a second component mode different from the first component mode prior to the predicted second change in operation of the vehicle (12).

Example 15. The system (32) of example 14, wherein operation of the vehicle (12) in the first vehicle mode comprises operation of the vehicle (12) with an engine (16) of the vehicle (12) turned on.

Example 16. The system (32) of any of the previous examples, wherein operation of the vehicle (12) in the second vehicle mode comprises operation of the vehicle (12) with the engine (16) turned off, and wherein predicting the second change in operation of the vehicle (12) comprises predicting when the engine (16) will be turned on.

Example 17. The system (32) of any of the previous examples, wherein the at least one component (14) of the vehicle (12) is a transmitter device, and wherein operation of the at least one component (14) in the first component mode includes at least one of operation of the transmitter device at a first transmission power level and operation of the transmitter device at a first repetition rate.

Example 18. The system (32) of example 17, wherein the transmitter device is part of a vehicle (12) to everything (V2X) transceiver, a vehicle (12) to infrastructure (V2I) transceiver, and a vehicle (12) to vehicle (V2V) transceiver.

Example 19. The system (32) of examples 17 to 18, wherein operation of the at least one component (14) in the second component mode includes at least one of operation of the transmitter device at a second transmission power level different than the first transmission power level, and operation of the transmitter device at a second repetition rate different from the first repetition rate.

Example 20. The system (32) of examples 17 to 19, wherein the second transmission power level is less than the first transmission power level.

Example 21. The system (32) of examples 17 to 20, wherein the second repetition rate is less than the first repetition rate.

Example 22. The system (32) of any of the previous examples, wherein the second change in operation of the vehicle (12) causes a reduction in a voltage level supplied to the transmitter device, and wherein operation of the at least one component (14) in the second component mode prior to the predicted second change in operation allows the transmitter device to continue functioning with the reduction in the voltage level supplied to the transmitter device caused by the predicted second change in operation of the vehicle (12).

Example 23. The system (32) of any of the previous examples, wherein after the second change in operation of the vehicle (12), operation of at least one component (14) of the vehicle (12) returns to the first component mode.

Example 24. The system (32) of any of the previous examples, wherein predicting the second change in operation of the vehicle (12) comprises estimating, based on when the first change in operation of the vehicle (12) occurred, when the second change in operation of the vehicle (12) will occur.

Example 25. The system (32) of any of the previous examples, wherein predicting the second change in operation of the vehicle (12) comprises determining, based on at least one communication received from a roadway infrastructure device, an indication of when at least one traffic condition that causes the second change in operation of the vehicle (12) will occur.

Example 26. The system (32) of any of the previous examples, wherein predicting the second change in operation of the vehicle (12) comprises determining, based on at least one communication received from at least one other vehicle, an indication of when at least one traffic condition that causes the second change in operation of the vehicle (12) will occur.

Example 27. A non-tangible computer readable storage medium (36) that stores instructions configured to cause a processing device (34) to:
- detect that a vehicle (12) is operating in a first vehicle mode;
- in response to detecting that the vehicle (12) is operating in a first vehicle mode, cause at least one component (14) of the vehicle (12) to operate in a first component mode;
- detect a first change in operation of the vehicle (12) from the first vehicle mode to a second vehicle mode different from the first vehicle mode;
- in response to detecting the first change in the operation of the vehicle (12), predict a second change in operation of the vehicle (12);
- in response to predicting the second change in operation of the vehicle (12), cause the at least one component (14) to operate in a second component mode different from the first component mode prior to the predicted second change in operation of the vehicle (12).

What is claimed is:

1. A method comprising:
operating at least one component of a vehicle in a first power mode;
predicting a crank event of the vehicle, the crank event affecting power provided by the vehicle to the at least one component due to a transition from an off engine state of the vehicle to an on engine state of the vehicle; and
in response to predicting the crank event, operating the at least one component in a second power mode to enable the at least one component to function using the power provided by the vehicle throughout the transition.

2. The method of claim 1, wherein the component comprises a transmitter.

3. The method of claim 2, wherein the first power mode includes operating the transmitter at a first transmission power level.

4. The method of claim 3, wherein the second power mode includes operating the transmitter at a second transmission power level that is less than the first transmission power level.

5. The method of claim 2, wherein the first power mode includes operating the transmitter at a first transmission rate.

6. The method of claim 5, wherein the second power mode includes operating the transmitter at a second transmission rate that is less than the first transmission rate.

7. The method of claim 1, wherein the component is one of:
vehicle-to-vehicle communication component;
vehicle-to-infrastructure communication component; or
vehicle-to-everything communication component.

8. The method of claim 1, further comprising in response to an engine of the vehicle being in the on engine state and the power no longer being affected by the crank event, operating the component in the first power mode.

9. The method of claim 1, wherein predicting the crank event comprises determining, based on at least one communication received from at least one other vehicle, an indication of a traffic condition that causes the crank event.

10. The method of claim 1, wherein predicting the crank event comprises determining, based on at least one communication received from at least one roadway infrastructure device, an indication of a traffic condition that causes the crank event.

11. A system comprising at least one controller configured to:
operate at least one component of a vehicle in a first power mode;
predict a crank event of the vehicle, the crank event affecting power provided by the vehicle to the at least one component due to a transition from an off engine state of the vehicle to an on engine state of the vehicle; and
in response to predicting the crank event, operate the at least one component in a second power mode to enable the at least one component to function using the power provided by the vehicle throughout the transition.

12. The system of claim 11, wherein the component is a communication device comprising at least one transmitter.

13. The system of claim 12, wherein:
the first power mode includes at least one of operating the transmitter at a first transmission power level or a first transmission rate;
the second power mode includes at least one of operating the transmitter at a second transmission power level or a second transmission rate; and
the second transmission power level and the second transmission rate are less than the first transmission power level and the first transmission rate, respectively.

14. The system of claim 11, wherein the controller is configured to predict the crank event by at least determining, based on at least one communication received from at least one other vehicle, an indication of a traffic condition that causes the crank event.

15. The system of claim 11, wherein the controller is configured to predict the crank event by at least determining, based on at least one communication received from at least one roadway infrastructure device, an indication of a traffic condition that causes the crank event.

16. A computer-readable storage medium comprising instructions that, when executed, configure at least one processor to:
operate at least one component of a vehicle in a first power mode;
predict a crank event of the vehicle, the crank event affecting power provided by the vehicle to the at least one component due to a transition from an off engine state of the vehicle to an on engine state of the vehicle; and
in response to predicting the crank event, operate the at least one component in a second power mode to enable the at least one component to function using the power provided by the vehicle throughout the transition.

17. The computer-readable storage medium of claim 16, wherein the component is a communication device comprising at least one transmitter.

18. The computer-readable storage medium of claim 17, wherein:
the first power mode includes at least one of operating the transmitter at a first transmission power level or a first transmission rate;
the second power mode includes at least one of operating the transmitter at a second transmission power level or a second transmission rate; and
the second transmission power level and the second transmission rate are less than the first transmission power level and the first transmission rate, respectively.

19. The computer-readable storage medium of claim 16, wherein the instructions, when executed, configure the processor to predict the crank event by at least determining, based on at least one communication received from at least one other vehicle, an indication of a traffic condition that causes the crank event.

20. The computer-readable storage medium of claim 16, wherein the instructions, when executed, configure the processor to predict the crank event by at least determining, based on at least one communication received from at least one roadway infrastructure device, an indication of a traffic condition that causes the crank event.

21. The method of claim 1, further comprising operating the component in the first power mode prior to predicting the crank event, and operating the component in the second power mode in response to predicting the crank event, wherein operating the component in the second power mode during the crank event allows the component to continue functioning during the crank event.

22. The method of claim 1, further comprising operating the component at a first voltage level prior to predicting the crank event, and operating the component at a second voltage level in response to predicting the crank event, wherein operating the component at the second voltage level during the crank event allows the component to continue functioning during the crank event.

* * * * *